(12) United States Patent
Volz et al.

(10) Patent No.: US 8,086,732 B1
(45) Date of Patent: Dec. 27, 2011

(54) METHOD AND APPARATUS FOR RATE LIMITING CLIENT REQUESTS

(75) Inventors: Bernard Volz, Center Harbor, NH (US); Kenneth E. Kinnear, Jr., Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 11/480,305

(22) Filed: Jun. 30, 2006

(51) Int. Cl.
*G06F 15/173* (2006.01)

(52) U.S. Cl. ........ 709/225; 709/223; 709/224; 709/226; 709/200

(58) Field of Classification Search .................. 709/203, 709/223, 224, 225, 220, 226, 245; 726/22, 726/23
See application file for complete search history.

(56) References Cited

U.S. PATENT DOCUMENTS

| | | | | |
|---|---|---|---|---|
| 5,884,024 | A * | 3/1999 | Lim et al. ........................... | 726/3 |
| 7,051,089 | B1 | 5/2006 | Johnson et al. | |
| 7,421,499 | B1 * | 9/2008 | Lanahan et al. ............. | 709/226 |
| 7,457,965 | B2 * | 11/2008 | Tamura et al. ................. | 713/182 |
| 7,706,491 | B2 * | 4/2010 | Nakamori et al. ............ | 375/355 |
| 7,788,718 | B1 * | 8/2010 | Fei et al. .......................... | 726/22 |
| 2003/0142642 | A1 * | 7/2003 | Agrawal et al. ............... | 370/328 |
| 2004/0162899 | A1 * | 8/2004 | Dommety ...................... | 709/225 |
| 2004/0228302 | A1 * | 11/2004 | Seol ............................... | 370/329 |
| 2005/0047418 | A1 * | 3/2005 | Kang ........................ | 370/395.42 |
| 2005/0086502 | A1 * | 4/2005 | Rayes et al. ................... | 713/189 |
| 2006/0072451 | A1 * | 4/2006 | Ross ............................... | 370/229 |
| 2006/0230305 | A1 * | 10/2006 | Smith et al. ........................ | 714/4 |
| 2006/0288411 | A1 * | 12/2006 | Garg et al. ...................... | 726/22 |

OTHER PUBLICATIONS http://www.mikrotik.com/docs/ros/2.9/ip/dhcp, "DHCP Client Server," visited Jun. 13, 2006, 18 pages.

* cited by examiner

*Primary Examiner* — Kevin Bates
*Assistant Examiner* — Mohammed Ahmed
(74) *Attorney, Agent, or Firm* — BainwoodHuang

(57) ABSTRACT

As a server device receives packets from a client device, the server device counts the number of packets received over a particular time interval and compares the result with a preset packet transmission threshold. When the number of packets received from the client device in the time period reaches or exceeds the packet threshold, the server device can detect a potential malfunction of the client device and as such, refrains from processing further packets from the client device. By rate limiting based upon the number of packets received from the client device over a given time interval, rather than on the bandwidth taken by the requests received from the client device, the server device can minimize monopolization of the server device's resources as caused by the packets received at a relatively low rate from a client device.

16 Claims, 5 Drawing Sheets

METHOD AND APPARATUS FOR RATE LIMITING CLIENT REQUESTS

BACKGROUND

A computer network includes computer processors or "hosts" that host software applications that provide or request services, or both. The hosts may be network terminals or end stations that do not perform network traffic routing or forwarding functions. The hosts communicate with each other through network devices, such as switches and routers which perform routing and forwarding functions. When a host is added to a network, the host is typically assigned a logical network address.

In large-scale cable modem networks, end user hosts such as cable modems become active and inactive regularly as users initiate and terminate use of service. In this context, it is wasteful to give every computer a unique and permanent network address. A number of addresses sufficient for the simultaneously operating computers can be shared and reassigned as one host drops off the network and another host adds onto the network. Configuring each host is a tedious process to perform manually.

The Dynamic Host Configuration Protocol (DHCP) provides a mechanism through which computers using Transmission Control Protocol/Internet Protocol (TCP/IP) can obtain network addresses and other configuration information automatically. A DHCP server process operates on a DHCP server that is conveniently located for several hosts on one or more local networks. As a host comes onto the network, the host and DHCP server exchange DHCP messages and, as a result of the exchange, the DHCP server assigns the host an Internet Protocol (IP) address for a given lease period. Halfway through the lease period, the host exchanges DHCP messages with the DHCP server to renew the lease and maintain the IP address.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention relate to a method and apparatus for rate limiting client requests based upon the number of requests or packets received from a particular client device during a given time interval. As a server device receives packets from a client device, the server device counts the number of packets received over a particular time interval and compares the result with a preset packet transmission threshold. When the number of packets received from the client device in the time period reaches or exceeds the packet threshold, the server device can detect a potential malfunction of the client device and, as such, can refrain from processing further packets from the client device. By rate limiting based upon the number of packets received from the client device over a given time interval rather than based upon the bandwidth of the requests, the server device can minimize monopolization of the server device's resources as caused by the packets received at a relatively low rate from a client device. Additionally, the server device can continue to receive packets from the client device and can monitor the number of packets received over a given time interval. In such a case, if the client device corrects its behavior and transmits packets to the server device over a timeframe that is below the packet threshold, the server device can then accept and process additional packets from the client device.

Figure 1:
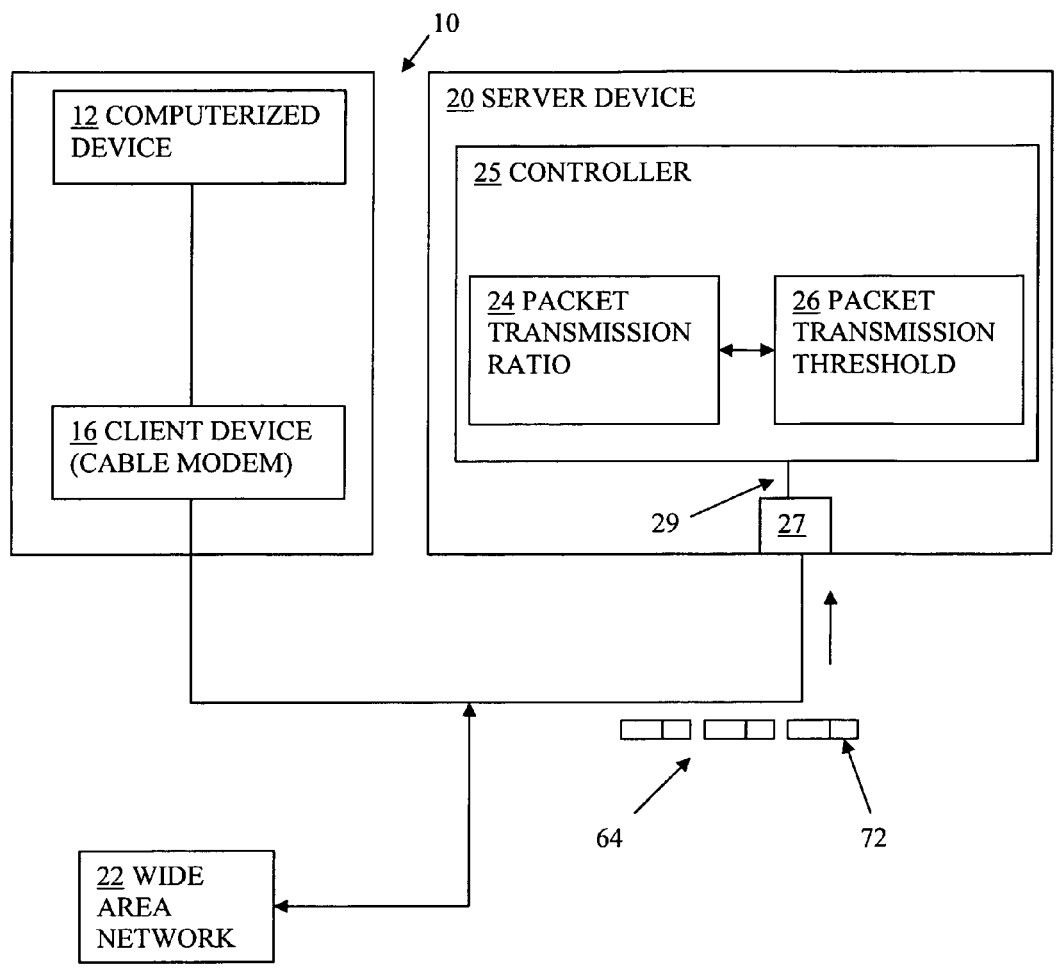
FIG. 1 illustrates a schematic representation of a communications network, according to one embodiment of the invention.

FIG. 1 illustrates an arrangement of a data communications network 10, such as a cable modem network. The network 10 includes a computerized device 12, such as laptop computer or stand-alone personal computer, and a client device 16, such as a cable modem. The cable modem 16 is configured to provide the computerized device 12 with access to a wide-area network (WAN) 22, such as the Internet, using a TCP/IP communications protocol.

When the modem 16 appears on the network 10, such as after being connected to the network 10 and powered, the modem 16 does not include a network address, such as an IP address, to identify itself and the computerized device 12 on the WAN 22. As shown, the network 10 includes a DHCP server device 20 that, in one arrangement, includes a controller 25, such as a processor and a memory, electrically coupled to one or more communications interfaces 27 via an interconnection mechanism 29. The DHCP server device 20 is configured to assign an IP addresses to requesting client devices on the network 10 for given period of time, termed a lease period.

Figure 2:
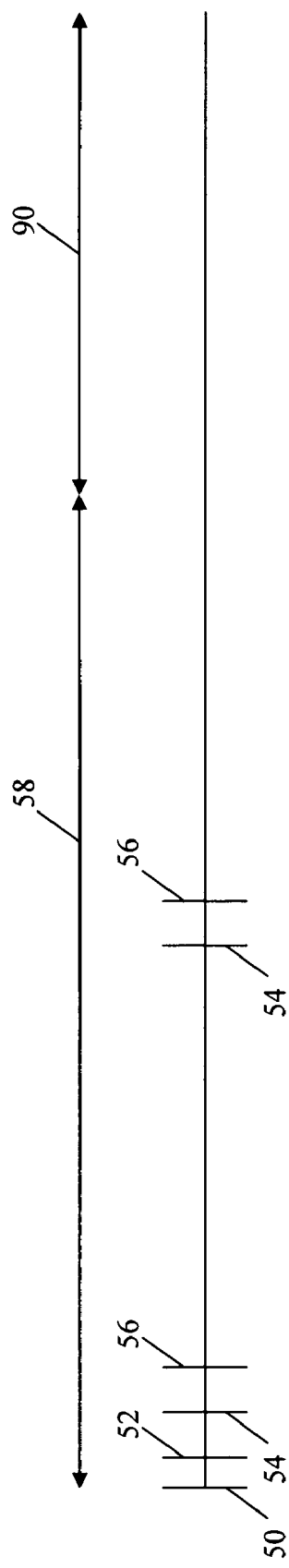
FIG. 2 is a representation of a timeline for an exchange of DHCP messages between the client device and the server device of FIG. 1.

For example, with reference to FIG. 2, when the cable modem 16 appears on the network 10, the modem 16 transmits, using the TCP/IP protocol, a DHCP discover message 50 to the DHCP server device 20 to initiate the DHCP process. In response, the DHCP server device 20 returns one or more offer messages 52 to the modem 16. The modem 16 then sends the DHCP server device 20 a DHCP request message 54 to request the lease of an IP address and in response, receives a DHCP acknowledgement (ACK) 56 along with an IP address. As indicated above, the client device 16 leases the IP address for a given period of lease period 58, such as a two hour period. If the client device 16 requires continued use of the IP address, to renegotiate the lease with the DHCP server device 20 and begin a second lease period 90, the client device 16 initiates the renewal approximately halfway through the lease time 58 by transmitting another DHCP request message 54 to the DHCP server device 20 and, in return, receiving an ACK 56 in response.

Figure 3:
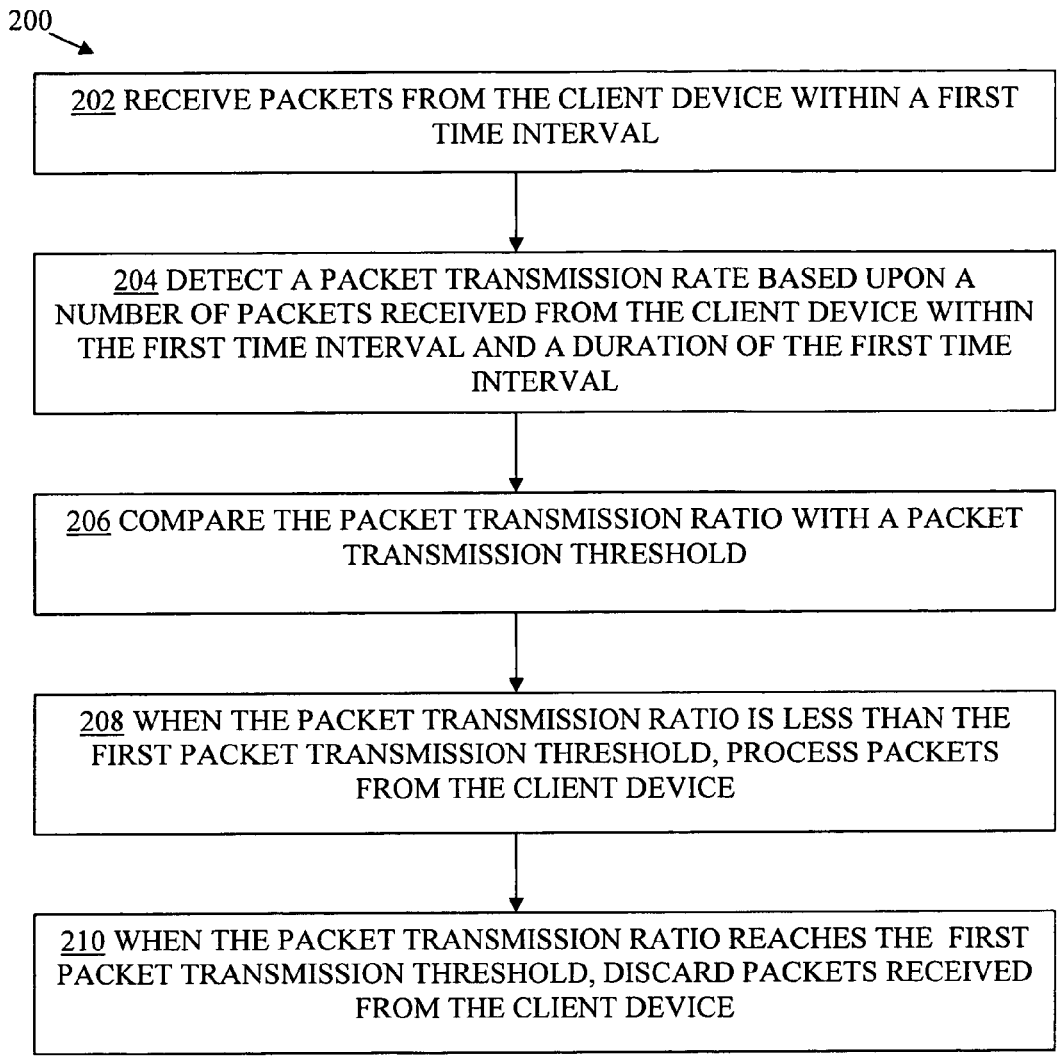
FIG. 3 is a flowchart that illustrates a procedure performed by the server device of FIG. 1 when rate limiting packet requests from a client device, according to one embodiment of the invention.

In certain cases, the cable modem 16 can malfunction and erroneously transmit packets to the DHCP server device 20 at a relatively low rate, such as a rate between one packet per second and one-thousand packets per second. Such a range of transmission rates can be considered substantially faster than the rate at which the DHCP server device 20 typically receives (e.g., one packet per hour) packets. However, this range of packet transmission rates is relatively low compared to the packet transmission rates at which conventional rate limiting procedures would be utilized. In one arrangement, the DHCP server device 20 (e.g., a controller such as a memory and a processor of the DHCP server device 20) is configured to perform a rate limiting procedure for incoming packets which accounts for packets transmitted at a relatively low rate from the client devices 16 in the network 10. While the description of the rate limiting procedure is related to the single client device 16, it should be understood that the DHCP server device 20 performs the rate limiting procedure when receiving packets at a relatively low rate of transmission from multiple client devices 16 in the network 10. FIG. 3 is a flowchart 200 that illustrates a procedure performed by the DHCP server device 20 when performing such a rate limiting procedure.

In step 202, the DHCP server device 20 receives packets from the client device 16 within a first time interval. In one arrangement, the packets are DHCP request packets transmitted from the client device 16 that include a request to renew a lease of an Internet Protocol (IP) address initially provided by the DHCP server device 20. For example, with reference to FIG. 4, the client device 16 erroneously transmits multiple DHCP request packets 64 to the DHCP server device 20 at a rate of one packet per second during a time period between the start 62 of the second hour of the lease period 58 and the end 60 of the lease period 58. The DHCP server device 20 receives the DHCP request packets 64 and provides corresponding ACK packets 65 back to the client device 16. For the purpose of the rate limiting procedure, the DHCP server device 20 analyzes the DHCP request packets 64 within a given time interval 66, such as a thirty second time interval, where the time interval 66 is less than the lease period 58.

Figure 4:
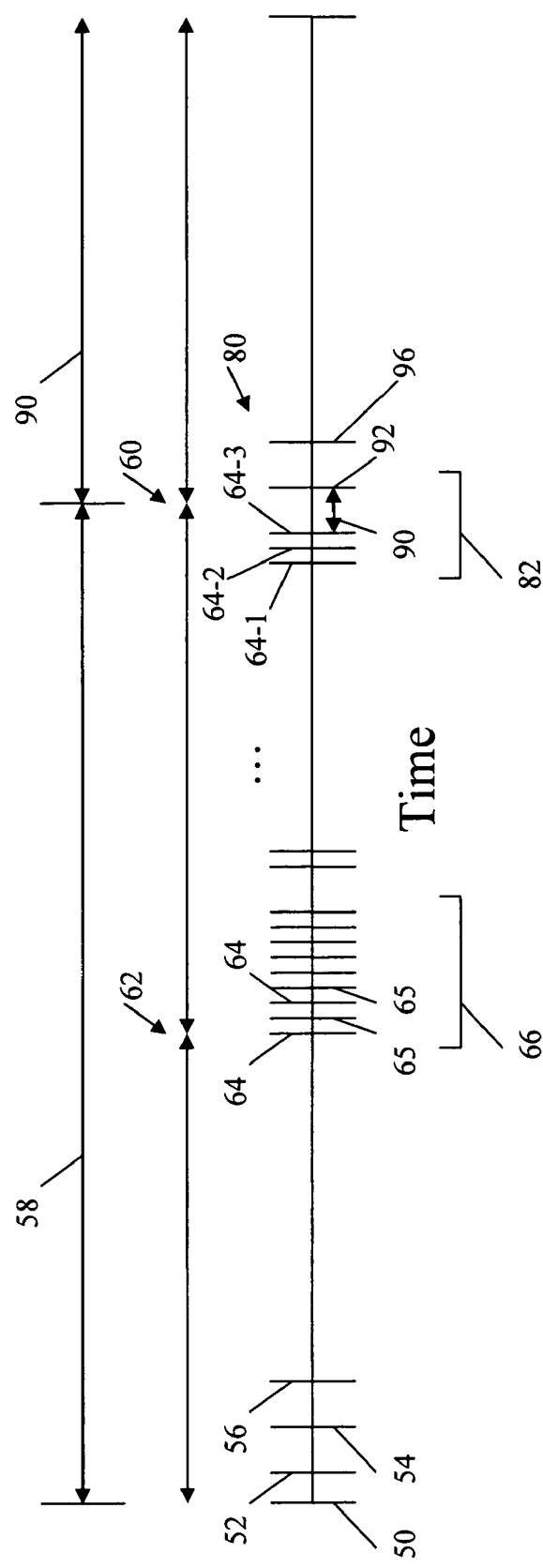
FIG. 4 is a representation of a timeline for an erroneous exchange of DHCP messages between the client device and the server device of FIG. 1.

Returning to FIG. 3, in step 204, the DHCP server device 20 detects a packet transmission rate 24 based upon the number of packets received from the client device within the first time interval and a duration of the first time interval. For example, as indicated in FIG. 4, assume the DHCP server device 20 receives fifteen DHCP request packets 64 from a single client device within a thirty second time interval 66. The DHCP server device 20 can then calculate the packet transmission rate 24 as the ratio of fifteen packets 64 transmitted from the client device 16 over the thirty second time interval 66, for example.

Returning to FIG. 3, in step 206, the DHCP server device 20 compares the packet transmission rate 24 with a first packet transmission threshold 26. In one arrangement, the first packet transmission threshold 26 represents an erroneously high packet transmission rate from a client device 16. A comparison of the packet transmission rate 24 with the first packet transmission threshold 26 allows the DHCP server device 20 to detect if a client device 16 is monopolizing the resources of the DHCP server device 20.

In step 208, when the packet transmission rate 24 is less than the first packet transmission threshold 26 the DHCP server device 20 processes the packets from the client device 16. For example, with reference to FIG. 4, assume the DHCP server device 20 receives five request packets 64 from a single client device 16 within a thirty second time interval 66 and the first packet transmission threshold 26 of the DHCP server device 20 is set to ten packets within a thirty second interval. Based upon a comparison of the packet transmission rate 24 with the first packet transmission threshold 26, the DHCP server device 20 detects that the packet transmission rate 24 is less than the first packet transmission threshold 26 thereby indicating that the client device 16 is operating properly and is not monopolizing processing resources of the DHCP server device 20. As a result, the DHCP server device 20 continues to process packets received from the client device 16 (e.g., transmitting ACK packets to the client device 16 in response to receiving DHCP requests).

Returning to FIG. 3, in step 210, when the packet transmission rate 24 reaches the first packet transmission threshold, the DHCP server device 20 begins discarding packets received from the client device 16. For example, with reference to FIG. 4, assume the DHCP server device 20 receives fifteen packets 64 from a client device 16 within a thirty second time interval 66 and the first packet transmission threshold 26 of the DHCP server device 20 is set to ten packets within a thirty second interval. Based upon a comparison of the packet transmission rate 24 with the first packet transmission threshold 26, the DHCP server device 20 detects that the packet transmission rate 24 is greater than the first packet transmission threshold 26. As a result, while the DHCP server device 20 will continue to receive packets from the client device 16, the DHCP server device 20 will discontinue the processing of packets received from the client device 16 (e.g., refrain from transmitting ACK packets to the client device 16 in response to receiving DHCP requests).

By rate limiting a client device 16 based upon the number of packets received from the client device 16 over a given time interval 66 rather than on the bandwidth of the requests received from the client device 16, the DHCP server device 20 can minimize monopolization of the server device's resources caused by the packets received at a relatively low rate. Additionally, it should be understood that the client device 16 sends the DHCP request packets 64 to the DHCP server device 20 using the TCP/IP protocol. As such, the overall size or length of the packets 64 varies from packet to packet. The aforementioned rate limiting procedure, however, is not dependent upon the size the packets received by the DHCP server device 20 over a time period because the rate limiting procedure is based upon the number of packets received from the client device in a given time period.

In one arrangement, in order to perform the rate limiting procedure described above, the DHCP server device 20 must first identify the client devices 16 in the network 10 transmitting the multiple packets to the serve device 20. For example, as indicated in FIG. 1, the DHCP server device 20 receives DHCP request packets 64 not only from the client device 16, but from other client devices (not shown) in the network 10. In order to accurately rate limit the DHCP request packets received from a particular client device 16, the DHCP server device 20 detects the origin or source for each of the packets it receives. In one arrangement, as shown in FIG. 1, to detect the source of the received DHCP request packets 64, the DHCP server device 20 reviews a client hardware address field 72 of each DHCP request packet 64. For example, in a given time interval, if upon review of the client hardware address field 72 of fifteen DHCP request packets 64 the server device 16 detects that fourteen of the packets 64 originated from the cable modem 16, the DHCP server device 20 could detect that the cable modem 16 was erroneously sending messages at a relatively high rate. As such, the DHCP server device 20 can rate limit packets transmitted from the cable modem 16 while continuing to process packets transmitted from other client devices in the network 10.

As indicated above, in the case where the DHCP server device 20 detects that the packet transmission rate 24 associated with a particular client device 16 in the network 10 exceeds the preset packet transmission threshold, the DHCP server device 20 will discard or discontinue processing of the packets 64 received from the client device 16 as it receives the packets from the client device 16. For example, as shown in FIG. 4, following the first time interval 66 and during the time period between the start 62 of the second hour of the lease period 58 and the end 60 of the lease period 58, the DHCP server device 20 continues to discard packets 64 received from the client device 16. Also in the time period between the start 62 of the second hour of the lease period 58 and the end 60 of the lease period 58, the DHCP server device 20 also monitors the number of packets received from the client device 16 over a second time interval. Based upon such monitoring, the DHCP server device 20 can detect whether the client device 16 refrains from transmitting multiple packets, such as DHCP request packets, to the DHCP server device 20. In the event the client device 16 does refrain from such activity, and a result of the detection, the DHCP server device 20 can provide the client device 16 with an opportunity to resume its previous interaction with the DHCP server device 20.

In one arrangement, as shown in FIG. 4, the DHCP server device 20 monitors the packets 80 received from the client device 16 over a second time interval 82. While the duration of the second time interval 82 can be equal to the duration of the first time interval 66, it should be understood that the second time interval 82 monitored by the DHCP server device 20 can be less than or greater that the duration first time interval 66. During the monitoring process, the DHCP server device 20 detects a packet transmission rate associated with the interval based upon the number of packets 80 received from the client device 16 within the second time interval 82 and the duration of the second time interval 82. The DHCP server device 20 then compares the detected packet transmission rate with a second packet transmission threshold. In one arrangement, the second packet transmission threshold is substantially less that the first packet transmission threshold. For example, in the case where the first packet transmission threshold is set to ten packets within a thirty second interval, the second packet transmission threshold can be set to five packets within a thirty second time interval. By using a substantially reduced value of the second packet transmission threshold as a basis of comparison the DHCP server device 20 can ensure that any changes in the packet transmission rate associated with the client device 16 represent actual changes in the behavior of the client device 16. When the detected packet transmission rate falls below the second packet transmission threshold, the DHCP server device 20 detects that the client device 16 has corrected its behavior and, as a result can process subsequent packets received from the client device 16.

For example, as shown in FIG. 4, assume the DHCP server device 20 monitors packets 80 received from the client device 16 over a second time interval 82 during the end of the first IP address lease period 58 and the beginning of a second IP address lease period 90. As shown, during the second time interval 82 near the end of the first lease period 58, the client device 16 transmits three DHCP request messages 64-1, 64-2, 64-3 to the DHCP server device 20. Also during the second time interval 82 at the end of the first lease period 58 and the start of the second lease period 90, the client device 16 transmits a second DHCP discover message 92 to the DHCP server device 20 to renegotiate the lease period with the DHCP server device 20.

In the case where a time duration 95 between the last DHCP request message 64-3 and the second DHCP discover message 92 is relatively long, when the DHCP server device 20 receives the second DHCP discover message 92, the detected packet transmission rate for the time interval 82 would fall below the second packet transmission threshold. As a result, the DHCP server device 20 would process the second DHCP discover message 92 received from the client device 16. For example, assume that the second time interval 82 (e.g., the time between the transmission of the first DHCP request messages 64-1 and the transmission of the DHCP discover message 92) has a duration of thirty seconds. The DHCP server device 20 can then detect the second packet transmission rate as the ratio of four packets over thirty seconds. In the case where the second packet transmission rate is set to five packets every thirty seconds, because the detected packet transmission rate falls below the second packet transmission threshold, the DHCP server device 20 processes the DHCP discover message 92 from the client device 16 by transmitting an offer 96 to the client device 16. The DHCP server device 20 receives a request message (not shown) from the client device and transmits an ACK message (not shown) to renew the lease to the client device 16.

In the case where the time interval 95 between the last DHCP request message 64-3 and the second DHCP discover message 92 is relatively short, the detected packet transmission rate for the time interval 82 would not fall below the second packet transmission threshold. As a result, the DHCP server device 20 would not process the second DHCP discover message 92 received from the client device 16. For example, assume that the second time interval 82 (e.g., the time between the transmission of the first DHCP request messages 64-1 and the transmission of the DHCP discover message 92) has a duration of twenty seconds. The DHCP server device 20 detects the second packet transmission rate as the ratio of four packets over twenty seconds. In the case where the second packet transmission rate is set to five packets every thirty seconds, because the detected packet transmission rate does not fall below the second packet transmission threshold, the DHCP server device 20 does not process the DHCP discover message 92 from the client device 16. However, per the TCP/IP protocol, the client device 16 retransmits the DHCP discovery message 92 at incrementally increasing amounts of time from the last DHCP request message 64-3 (e.g., two seconds, four seconds, eight seconds, etc.) until the detected packet transmission rate falls below the second packet transmission threshold thereby causing the DHCP server device 20 to process the DHCP discovery message 92.

Figure 5:
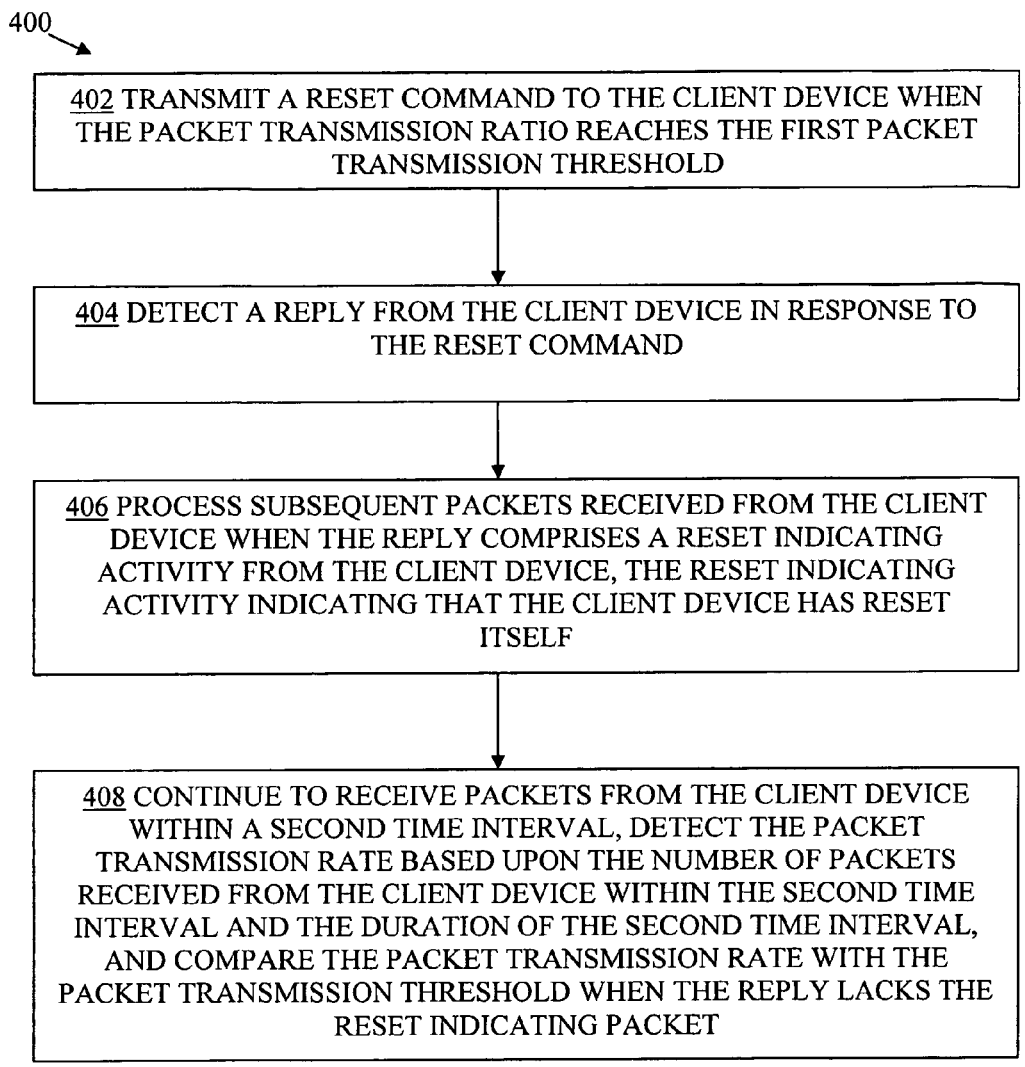
FIG. 5 is a flowchart that illustrates another procedure performed by the server device of FIG. 1 when rate limiting packet requests from a client device, according to one embodiment of the invention.

As indicated above, as a result of the rate limiting procedure, the DHCP server device 20 can discontinue processing of packets received from the client device 16 but will continue to receive and monitor packets from the client device 16. As a result, in the case where the client device 16 refrains from transmitting multiple packets, such as DHCP request packets, the DHCP server device 20 provides the client device 16 with an opportunity to resume its previous interaction with the DHCP server device 20. In such an arrangement, the DHCP server device 20 performs a generally passive role in correcting the behavior of the client device 16. In one arrangement, the DHCP server device 20 also attempts to actively correct the activity of the client device 16 while discarding the packets received from the client device 16. FIG. 5 is a flowchart 400 that illustrates such a procedure performed by the DHCP server device 20.

In step 402, the DHCP server device 20 transmits a reset command to the client device 16 when the packet transmission rate reaches the first packet transmission threshold. For example, as shown in FIG. 4, during an IP address lease period 58 during which the client device 16 possesses a lease for an IP address, the client device 16 can erroneously transmit multiple DHCP request packets 64 to the DHCP server device 20 in an attempt to renew the lease for an assigned IP address. However, as shown, these DHCP request packets 64 are erroneously transmitted before the end of the lease period 60. In response to each of the DHCP request packets 64, the DHCP server device 20 transmits, as the reset command, a negative acknowledgement (NAK) to the client device 16 in an attempt to stop the client device 16 from transmitting the DHCP request packets 64. The NAKs indicate a denial, by the DHCP server device 20, of the client device's 16 requests to renew the lease of the IP address initially provided by the DHCP server device 20.

In step 404, the DHCP server device 20 detects a reply from the client device 16 in response to the reset command. For example, the client device 16 can transmit a response signals to the DHCP server device 20 in response to the reset command.

In step 406, when the reply is a reset indicating activity from the client device 16 that indicates that the client device 16 has reset itself, the server device processes subsequent packets received from the client device 16. In one arrangement, when the client has reset itself, the client device 16 can transmit a DHCP discover message to the DHCP server device 20 to initiate an IP address assignment procedure with the server device. In response to receiving the DHCP discover message, the server device processes subsequent packets received from the client device 16. In another arrangement, when the client device 16 has reset itself, the client device 16 refrains from transmitting packets to the DHCP server device 20 such that the packet transmission rate falls below the first packet transmission threshold.

In step 408, when the reply lacks a reset indicating packet, the DHCP server device 20 continues to receive packets from the client device 16 within a second time interval, detects the packet transmission rate based upon the number of packets received from the client device 16 within the second time interval and the duration of the second time interval, and compares the packet transmission rate with a second packet transmission threshold. For example, when the reply includes additional DHCP request packets from the client device 16, the DHCP server device 20 will continue to receive and monitor the packets transmitted from the client device 16. As such, the DHCP server device 20 provides the client device 16 with an opportunity to resume its interaction with the DHCP server device 20 when the client device 16 refrains from transmitting multiple DHCP request packets to the DHCP server device 20. For example, when the packet transmission rate is less than the second packet transmission threshold, the DHCP server device 20 processes the packets received from the client device 16. However, in the case where the packet transmission rate is greater than the second packet transmission threshold, the DHCP server device 20 can detect this relationship as indicating the presence of a fatal error in the client device 16. As a result, the DHCP server device 20 discards all subsequent packets received from the client device 16. As such, the client device 16 is unable to renew or retrieve an IP address from the server device and would require user attention.

While this invention has been particularly shown and described with references to preferred embodiments thereof, it will be understood by those skilled in the art that various changes in form and details may be made therein without departing from the spirit and scope of the invention as defined by the appended claims.

For example, in the above described rate limiting process, a server device counts the number of packets received over a particular time interval and compares the result with a preset packet transmission threshold. When the number of packets received from the client device in the time period reaches or exceeds the packet threshold, the server device can detect a potential malfunction of the client device and as such, refrains from processing further packets from the client device. As indicated, the rate limiting process is adapted to communication between a DHCP server and a DHCP client. Such description is by way of example only. In one arrangement, the rate limiting process can be utilized by any type of server device that normally receives multiple messages or packets from devices on a network at a relatively low rate, such as one request per second.

What is claimed is:

1. In a server device, a method for rate limiting packets transmitted from a client device, comprising:
   receiving Dynamic Host Configuration Protocol (DHCP) request packets from the client device within a first time interval, the DHCP request packets including requests to renew a lease of an Internet Protocol (IP) address provided by the server device;
   detecting a packet reception rate based upon (i) a number of DHCP request packets received from the client device within the first time interval and (ii) a duration of the first time interval; and
   comparing the packet reception rate with a first packet reception threshold,
   when the packet reception rate is less than the first packet reception threshold, processing DHCP request packets from the client device, and
   when the packet reception rate reaches the first packet reception threshold, continuing to receive DHCP request packets from the client and discontinuing processing of each of the DHCP request packets in response to continuing to receive the DHCP request packets;
   wherein comparing the packet reception rate with a first packet reception threshold comprises comparing the packet reception rate with a first packet reception threshold, the first packet reception threshold configured as a rate between one packet per second and one-thousand packets per second; and
further comprising:
transmitting a reset command to the client device when the packet reception rate reaches the first packet reception threshold;
detecting a reply from the client device in response to the reset command;
when the reply includes a reset indicating activity from the client device, the reset indicating activity indicating that the client device has reset itself, processing subsequent DHCP request packets received from the client device; and
when the reply lacks the reset indicating activity, receiving DHCP request packets from the client device within a second time interval, detecting the packet reception rate based upon (i) the number of DHCP request packets received from the client device within the second time interval and (ii) the duration of the second time interval, and comparing the packet reception rate with a second packet reception threshold.

2. The method of claim 1, wherein receiving DHCP request packets from the client device comprises receiving variable length packets from the client device within the first time interval.

3. The method of claim 1, wherein the first time interval is substantially less than a lease interval associated with the lease of the Internet Protocol (IP) address provided by the server device.

4. The method of claim 1, further comprising reviewing a client hardware address field of the DHCP request packets to identify the DHCP request packets as being transmitted from a single client device.

5. The method of claim 1, further comprising:
when discontinuing processing DHCP request packets received from the client device, continuing to receive DHCP request packets from the client device within a second time interval, detect the packet reception rate based upon (i) the number of DHCP request packets received from the client device within the second time interval and (ii) the duration of the second time interval, and compare the packet reception rate with a second packet reception threshold; and
when the packet reception rate falls below the second packet reception threshold, processing the DHCP request packets received from the client device.

6. The method of claim 1, further comprising:
when the packet reception rate is less than the second packet reception threshold, processing DHCP request packets from the client device; and
when the packet reception rate is greater than the second packet reception threshold, discarding all subsequent DHCP request packets received from the client device.

7. The method of claim 1, wherein:
transmitting the reset command to the client device comprises transmitting a negative acknowledgement (NAK) to the client device, the NAK indicating a denial, by the server device, to the requests to renew the lease of the IP address provided by the server device;
processing comprises processing subsequent DHCP request packets received from the client device when the reply comprises a DHCP discover message from the client device, the DHCP discover message initiating an IP address assignment procedure in the server device; and
continuing to receive packets comprises continuing to receive DHCP request packets from the client device within the second time interval, detect the packet reception rate based upon (i) the number of packets received from the client device within the second time interval and (ii) the duration of the second time interval, and compare the packet reception rate with the packet reception threshold when the reply comprises DHCP request packets from the client device, the DHCP request packets including request to renew a lease of an Internet Protocol address provided by the server device.

8. A server device, comprising:
at least one communications interface;
a controller; and
an interconnection mechanism coupling the at least one communications interface and the controller;
wherein the controller is configured to:
receive Dynamic Host Configuration Protocol (DHCP) request packets from the client device within a first time interval, the DHCP request packets including requests to renew a lease of an Internet Protocol (IP) address provided by the server device;
detect a packet reception rate based upon (i) a number of DHCP request packets received from the client device within the first time interval and (ii) a duration of the first time interval; and
compare the packet reception rate with a first packet transmission threshold,
when the packet transmission rate is less than the first packet transmission threshold, process DHCP request packets from the client device, and
when the packet reception rate reaches the first packet reception threshold, continuing to receive DHCP request packets from the client and discontinuing processing each of the DHCP request packets in response to continuing to receive the DHCP request packets;
wherein when comparing the packet reception rate with a first packet reception threshold, the controller is configured to compare the packet reception rate with a first packet reception threshold, the first packet reception threshold configured as a rate between one packet per second and one-thousand packets per second; and
wherein the controller is further configured to:
transmit a reset command to the client device when the packet reception rate reaches the first packet reception threshold;
detect a reply from the client device in response to the reset command;
when the reply includes a reset indicating activity from the client device, the reset indicating activity indicating that the client device has reset itself, process subsequent DHCP request packets received from the client device; and
when the reply lacks the reset indicating activity, receive DHCP request packets from the client device within a second time interval, detect the packet reception rate based upon (i) the number of DHCP request packets received from the client device within the second time interval and (ii) the duration of the second time interval, and compare the packet reception rate with a second packet reception threshold.

9. The server device of claim 8, wherein the first time interval is substantially less than a lease interval associated with the lease of the Internet Protocol (IP) address provided by the server device.

10. The server device of claim 8, wherein the controller is configured to review a client hardware address field of the DHCP request packets to identify the DHCP request packets as being transmitted from a single client device.

11. The server device of claim 8, wherein:
the controller is further configured to continue to receive DHCP request packets from the client device within a second time interval, detect the packet reception rate based upon (i) the number of DHCP request packets received from the client device within the second time interval and (ii) the duration of the second time interval, and compare the packet reception rate with a second packet reception threshold; and
when the packet reception rate falls below the second packet reception threshold, the controller is further configured to process the DHCP request packets received from the client device.

12. The server device of claim 8, wherein the controller is further configured to:
when the packet reception rate is less than the second packet reception threshold, process DHCP request packets from the client device; and
when the packet reception rate is greater than the second packet reception threshold, discard DHCP request packets received from the client device.

13. The server device of claim 8, wherein the controller is configured to:
transmit a negative acknowledgement (NAK) to the client device; the NAK indicating a denial, by the server device, to the requests to renew the lease of the IP address provided by the server device;

process subsequent DHCP request packets received from the client device when the reply comprises a DHCP discover message from the client device, the DHCP discover message initiating an IP address assignment procedure in the server device; and when continuing to receive DHCP request packets, continue to receive DHCP request packets from the client device within the second time interval, detect the packet reception rate based upon (i) the number of packets received from the client device within the second time interval and (ii) the duration of the second time interval, and compare the packet reception rate with the packet reception threshold when the reply comprises DHCP request packets from the client device, the DHCP request packets including request to renew a lease of an Internet Protocol address provided by the server device.

14. The server device of claim 8, wherein the server device is a DHCP server configured to assign IP addresses to requesting client devices.

15. In a server device, a method for rate limiting packets transmitted from a client device, comprising:

receiving packets from the client device within a first time interval;

detecting a packet transmission rate based upon (i) a number of packets received from the client device within the first time interval and (ii) a duration of the first time interval;

comparing the packet transmission rate with a first packet transmission threshold, when the packet transmission rate is less than the first packet transmission threshold, processing the packets from the client device, and when the packet transmission rate reaches the first packet transmission threshold, continuing to receive packets from the client and discontinuing processing each of the packets in response to continuing to receive the packets;

transmitting a reset command to the client device when the packet transmission rate reaches the first packet transmission threshold;

detecting a reply from the client device in response to the reset command;

processing subsequent packets received from the client device when the reply comprises a reset indicating activity from the client device, the reset indicating activity indicating that the client device has reset itself; and continuing to receive packets from the client device within a second time interval, detect the packet transmission rate based upon (i) the number of packets received from the client device within the second time interval and (ii) the duration of the second time interval, and compare the packet transmission rate with a second packet transmission threshold when the reply lacks the reset indicating activity.

16. The method of claim 15, wherein the packets are Dynamic Host Configuration Protocol (DHCP) request packets and further comprising reviewing a client hardware address field of the DHCP request packets to identify the DHCP request packets as being transmitted from a single client device.

* * * * *